US009804946B2

(12) United States Patent
Conlon et al.

(10) Patent No.: US 9,804,946 B2
(45) Date of Patent: Oct. 31, 2017

(54) SYSTEM AND METHOD FOR PROVIDING AUTOMATED COMPUTER LANGUAGE TRANSLATION AND VERIFICATION

(71) Applicant: ORACLE INTERNATIONAL CORPORATION, Redwood Shores, CA (US)

(72) Inventors: Brian P. Conlon, Grayslake, IL (US); Robert D. O'Connell, Jr., Budd Lake, NJ (US); Mark Ivan M. Domingo, Piscataway, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/722,491

(22) Filed: May 27, 2015

(65) Prior Publication Data
US 2016/0350204 A1   Dec. 1, 2016

(51) Int. Cl.
*G06F 11/36* (2006.01)
*G06F 9/45* (2006.01)
*G06F 9/50* (2006.01)

(52) U.S. Cl.
CPC .......... *G06F 11/3612* (2013.01); *G06F 8/433* (2013.01); *G06F 8/51* (2013.01); *G06F 9/5011* (2013.01)

(58) Field of Classification Search
CPC ........ G06F 11/3612; G06F 8/433; G06F 8/51; G06F 9/5011
See application file for complete search history.

(56) References Cited

U.S. PATENT DOCUMENTS

| | | | | |
|---|---|---|---|---|
| 6,389,588 B1* | 5/2002 | Wadhwa | .................. | G06F 8/74 717/106 |
| 6,453,464 B1* | 9/2002 | Sullivan | .................. | G06F 8/51 717/136 |
| 8,806,452 B2* | 8/2014 | Dhoolia | .................... | G06F 8/51 717/137 |
| 9,317,266 B1* | 4/2016 | Muldoon | .................. | G06F 8/51 |
| 2003/0084425 A1* | 5/2003 | Glaser | ..................... | G06F 8/433 717/110 |
| 2003/0182653 A1* | 9/2003 | Desoli | ................. | G06F 9/45516 717/138 |

(Continued)

*Primary Examiner* — Viva Miller
(74) *Attorney, Agent, or Firm* — Cooper Legal Group, LLC (57) ABSTRACT

Systems, methods, and other embodiments are disclosed that are configured to verify the translation of a program from a first programming language to a second programming language. In one embodiment, a first program is executed within a first thread of a process in parallel with a second program within a second thread of the process. A first source code of the first program is written in the first programming language, and a second source code of the second program is a translation of the first source code of the first program to the second programming language based on a translation process. Statement flow and program variables are compared at equivalent lines of code between the first program and the second program, during execution of the two programs in parallel, to generate execution results. The translation process is transformed, based on the execution results, facilitating correcting of the second source code.

20 Claims, 6 Drawing Sheets

(56) References Cited

U.S. PATENT DOCUMENTS

| | | | |
|---|---|---|---|
| 2014/0189663 A1* | 7/2014 | Guenthner | G06F 8/456 717/146 |
| 2014/0189664 A1* | 7/2014 | Guenthner | G06F 8/456 717/146 |
| 2015/0178104 A1* | 6/2015 | Venkatasubramanian | G06F 9/44589 717/126 |

* cited by examiner

SYSTEM AND METHOD FOR PROVIDING AUTOMATED COMPUTER LANGUAGE TRANSLATION AND VERIFICATION

BACKGROUND

When translating source code from one programming language to another programming language, a technique to verify the correctness of the resulting code is used. In many previous techniques, some degree of manual testing and debugging of the translated code was performed. However, a program can have millions of lines of code, and testing the correctness of the translation of the program can be extremely difficult and time consuming. Some codebases are too large to find translation problems in a manual manner.

Translations of large programs are often performed by consulting companies and tool vendors. Such vendors often provide software tools to translate a program. However, such approaches have been known to have shortcomings with respect to the level of detail that can be tested to determine correctness. Furthermore, when a translation error is shown to occur, the prior tools could not isolate the translation error to one or more lines of code within the translated program. Thus the translation error could not be identified and corrected except by multiple trial and error processes with multiple re-translations and re-verifications.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed for automatically translating a software program from a first programming language to a second programming language and verifying the translation. A translation process translates the first program to form a second program. To test and verify the translation in one embodiment, the first program is executed in cooperation with at least one external service on a computing device. Interaction data is captured between the first program and the external service to generate test data to be used during verification. For example, the first program and the second program are executed in parallel on a computing device and are driven by the interaction data during execution. Program flow and in-program data at equivalent lines of code between the first program and the second program are compared during the parallel execution of the programs.

If a discrepancy of program flow and/or in-program data is detected between the two programs at a particular line of code, the discrepancy is analyzed and the nature of the discrepancy is used to modify (i.e., correct) the translation process. The modified or corrected translation process is used again to translate the first program to form the second program. The first program and the second program are executed again in parallel on the computing device, as driven by the interaction data, to verify that the discrepancy no longer exists.

In one embodiment, the present system may be used in the field of legacy platform migration where a legacy program is translated and migrated to a new platform. The present system is configured to provide detailed translation verification and fault isolation so that errors in the translation can be identified and correlated to specific lines of code. The automated process of verification reduces the time spent verifying a translated program in actual hours and improves the level of accuracy of the translation. The improved accuracy helps to improve the confidence level to release the translated program into a production environment so that the translated program functions as the original legacy program.

The following terms are used herein with respect to various embodiments.

The term "program" (or "computer program") as used herein, refers to compiled or un-compiled computer-executable instructions or code. For example, a program may be in the form of source code written in a programming language. As another example, a program may be in the form of machine code that is configured to execute directly on the hardware of a computer and is derived (e.g., via a compiling process) from source code.

The term "program flow", as used herein, refers to going from one line of code (or program statement) to another during execution of a program. When comparing program flow between two programs executing in parallel, where one program is a translation of the other, it is desirable to verify that the two programs are at equivalent lines of code at any given time during the execution.

The term "in-program data", as used herein, refers to data that is generated within a program when executing. When comparing in-program data between two programs executing in parallel, where one program is a translation of the other, it is desirable to verify that the in-program data generated at any given time during the execution is the same for both programs.

The term "external service", as used herein, refers to a computing entity which a computer program (e.g., a COBOL program) may interface to and interact with during execution of the computer program. Some examples of external services include a browser, a database, a data structure (e.g., a file), a file system, and another program (e.g., a Java program).

The term "interaction data", as used herein, refers to information that flows between a computer program and an external service when the computer program is executing. This may include input data and corresponding output data that is produced based on the input data.

Figure 1:
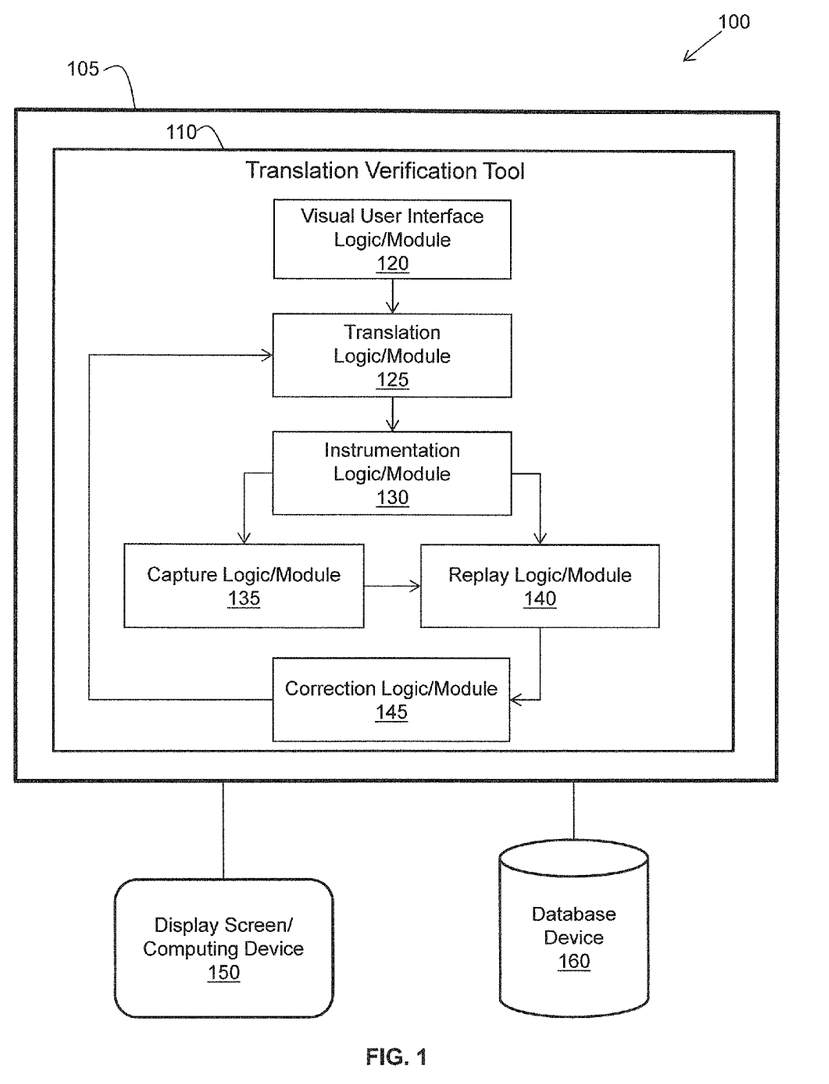
FIG. 1 illustrates one embodiment of a computer system, having a computing device configured with a translation verification tool.

FIG. 1 illustrates one embodiment of a computer system 100, having a computing device 105 configured with a translation verification tool 110. The translation verification tool 110 is configured to computerize the process of translating a program and verifying the translation. For example, in one embodiment, the translation verification tool 110 is configured to translate a legacy program from a first programming language to a second programming language and verify the translation by running the legacy program and the translated program in parallel on a computing device.

In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

The embodiments described herein allow verification of a translated program in an automated manner. Replay logic executes a legacy program and a translated program (i.e., a translation of the legacy program) in parallel within two parallel threads of a process on a computing device. The executed programs are driven by the same interaction data. Program flow and in-program data are compared at equivalent lines of code between the legacy program and the translated program to verify the translation.

In one embodiment, a computer algorithm is disclosed that implements an automated approach to verifying the translation of a computer program from a first programming language to a second programming language. It is assumed herein that the translation results in the translated program having lines of code that can be associated with equivalent lines of code in the original computer program.

With reference to FIG. 1, in one embodiment, the translation verification tool 110 is implemented on the computing device 105 and includes logics for implementing various functional aspects of the translation verification tool 110. In one embodiment, the translation verification tool 110 includes visual user interface logic 120 (e.g., a visual user interface module), translation logic 125 (e.g., a translation module), instrumentation logic 130 (e.g., an instrumentation module), capture logic 135 (e.g., a capture module), replay logic 140 (e.g., a replay module), and correction logic 135 (e.g., a correction module).

The computer system 100 also includes a display screen 150 operably connected via an operable connection to the computing device 105. In accordance with one embodiment, the display screen 150 is implemented to display views of and facilitate user interaction with a graphical user interface (GUI) generated by the visual user interface logic 120 for viewing and updating information associated with translating a program and verifying the translation. The graphical user interface may be associated with a translation verification application and the visual user interface logic 120 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 150 may represent multiple computing devices/terminals that allow users to access and receive services from the translation verification tool 110 via networked computer communications.

In one embodiment, the computer system 100 further includes at least one database device 160 operably connected to the computing device 105 and/or a network interface to access the database device 160 via a network connection. For example, in one embodiment, the database device 160 is operably connected via an operable connection to the visual user interface logic 120. In accordance with one embodiment, the database device 160 is configured to store and manage data structures (e.g., files or records associated with a translation process and/or translated programs) associated with the translation verification tool 110 in a database system (e.g., a computerized legacy program management system).

Other embodiments may provide different logics or combinations of logics that provide the same or similar functionality as the translation verification tool 110 of FIG. 1. In one embodiment, the translation verification tool 110 is an executable application including algorithms and/or program modules configured to perform the functions of the logics. The application is stored in a non-transitory computer storage medium. That is, in one embodiment, the logics of the translation verification tool 110 are implemented as modules of computer-executable instructions stored on a computer-readable medium.

Referring back to the logics of the translation verification tool 110 of FIG. 1, in one embodiment, the visual user interface logic 120 is configured to generate a graphical user interface (GUI) to facilitate user interaction with the translation verification tool 110. For example, the visual user interface logic 120 includes program code that generates and causes the graphical user interface to be displayed based on an implemented graphical design of the interface. In response to user actions and selections via the GUI, associated aspects of verifying a translation of a program may be manipulated. For example, a user may employ the GUI to edit a program (a first program) to be translated by the translation verification tool 110, or to edit the translated program (a second program).

For example, in one embodiment, the visual user interface logic 120 is configured to facilitate receiving inputs and reading data in response to user actions. For example, the visual user interface logic 120 may facilitate selection, reading, and inputting of computer programs to be translated from a first programming language to a second programming language. A computer program may reside in at least one data structure (e.g., within database device 160) associated with (and accessible by) a translation verification application (e.g., the translation verification tool 110) via the graphical user interface.

Furthermore, the visual user interface logic 120 is configured to facilitate the outputting and displaying of the source code of a translated computer program, via the graphical user interface, on the display screen 150. Execution results, associated with comparing the program flow and in-program data of a computer program and a translation of the computer program during execution, may also be output and displayed on the display screen 150 via the graphical user interface.

In one embodiment, translation logic 125 is configured to translate the first source code of a first program from a first programming language to a second programming language, generating the source code of a second program. For example, in one embodiment, the first programming language is COBOL (Common Business-Oriented Language) and the second programming language is a Java dialect which implements many COBOL semantics, or other Java-based language. Of course, other languages and other translations may be used. The Java dialect enables the translation logic 125 to perform a line-for-line translation, facilitating the matching of input COBOL lines of code to output Java lines of code to help verify the translation. The Java dialect also enables the translation logic 125 to maintain "programmer intent" such that the output Java code is readable and maintainable.

In one embodiment, instrumentation logic 130 is configured to instrument the first program with first instrumentation code to facilitate the capture of interaction data. Interaction data is generated when the first program is executed on, for example, computing device 105. The interaction data corresponds to data that passes back and forth between the first program and external services during execution. Thus, collecting run-time data helps to determine the behavior of the program. The collected data will be used to verify if the translated program operates and behaves in the same manner as the first program. For example, the first program may have source code written in COBOL and the external services may include one or more of a browser, a database, a data structure (e.g., a file), a file system, or another program (e.g., a Java program or another COBOL program).

When the first program is executed in cooperation with the external services, the interaction data may be captured. In one embodiment, capture logic 135 is configured to run the first program in cooperation with at least one external service and capture the interaction data between the first program and the external service during the running. The instrumentation code within the first program aids in the capturing of the interaction data. Again, the source code of the first program may be written in a first programming language such as, for example, COBOL. In accordance with one embodiment, the interaction data may be stored in the database device 160 until needed by the replay logic 140.

Furthermore, the instrumentation logic 130 is configured to instrument the first program and the second program with second instrumentation code. When the first program and the second program are executed in parallel, the second instrumentation code facilitates a comparison of program flow and in-program data at equivalent lines of code between the first program and the second program.

In one embodiment, replay logic 140 is configured to perform an execution of the first program and the second program in parallel as part of the verification process. The first program and the second program are both driven by the same interaction data during the execution. Executing the two programs in parallel in this manner should produce identical results if the translation is correct. Again, the source code of the second program is a translation of the first source code of the first program from the first programming language (e.g., COBOL) to the second programming language (e.g., a Java dialect).

If the second program is accurately translated, then the second program should produce the same run-time flow and same output results based on the same interaction data as does the first program. Thus, both programs should function the same. If the two programs produce different output results, which are regarded as being caused by translation errors, the program code responsible for the different outputs can be identified and the translation can be corrected.

In accordance with one embodiment, the replay logic 140 executes the first program within a first thread of a process and executes the second program within a second thread of the same process. The first thread and the second thread are executed in parallel such that a line-for-line comparison of the first program and the second program (the translation) can be made. In this way, a detailed comparison of the two programs can be performed to identify the slightest difference in program flow as the two programs run within the two threads of the same process, thus verifying the accuracy of the translation. Given that the threads run in the same process and share memory directly, in-program data can be compared as well.

Therefore, the replay logic 140 is configured to compare program flow and in-program data at equivalent lines of code between the first program and the second program during execution to generate execution results. Any difference in the execution results between the two programs running in parallel is indicative of an error in the translation process. Again, the second instrumentation code facilitates a comparison of program flow and in-program data at equivalent lines of code between the first program and the second program.

In one embodiment, the correction logic 145 is configured to transform the translation logic 125, based at least in part on the execution results, to facilitate correction of the translation of the first source code of the first program to the second programming language. For example, if the execution results show that a program flow and/or in-program data does not match up at some point during the parallel execution of the first program and the second program, then it is assumed that something is wrong with the translation. Therefore, the correction logic 145 is configured to analyze the execution results and identify the code involved in producing the non-matching execution results in both the first program (original code) and the corresponding code in the second program (translated code). Then, for example, the correction logic 145 may determine that the translation process incorrectly translated the original code.

Suppose the original code is a COBOL instruction AAA and the translated code is Java instruction BBB. But, the correction logic 145 determines that the translated code should be Java instruction A1A1A1. Thus, the correction logic 145 automatically transforms (e.g., modifies or corrects) the translation logic 125 in an attempt to correct the translation problem. Accordingly, the translation logic 125 is modified so that when a COBOL instruction AAA is found during a translation, the COBOL instruction is translated to Java instruction A1A1A1. Of course, this example is only for description purposes.

Once the translation logic 125 (e.g., instructions of a translation module) is transformed, the translation process may be repeated by the newly transformed translation logic 125 to translate the source code of the first program to the second programming language to form the corrected second program. The replay logic 140 may again execute the two programs in parallel and generate execution results. The accuracy of the corrected second program is then determined from the execution results. Such a process may be iterated until the execution results indicate that there are no differences between the program flow and the in-program data between the two programs or until a threshold number of differences are met.

In this manner, the translation verification tool 110 can automatically do the heavy work of translating and verifying a program. The translation verification tool 110 provides for the efficient and cost-effective translation of a program from one programming language to another. Very large programs (e.g., having millions of lines of code) can be translated and verified by the translation verification tool. As a result, large legacy programs that are written in outdated programming languages can be updated to more desirable and modern programming languages. Thus, the ability to execute a computer program and a translation of the computer program on a computing device in parallel, and compare results as the two programs are driven by the same interaction data, constitutes an improvement to the technical field of computerized legacy program translation and verification.

Figure 2:
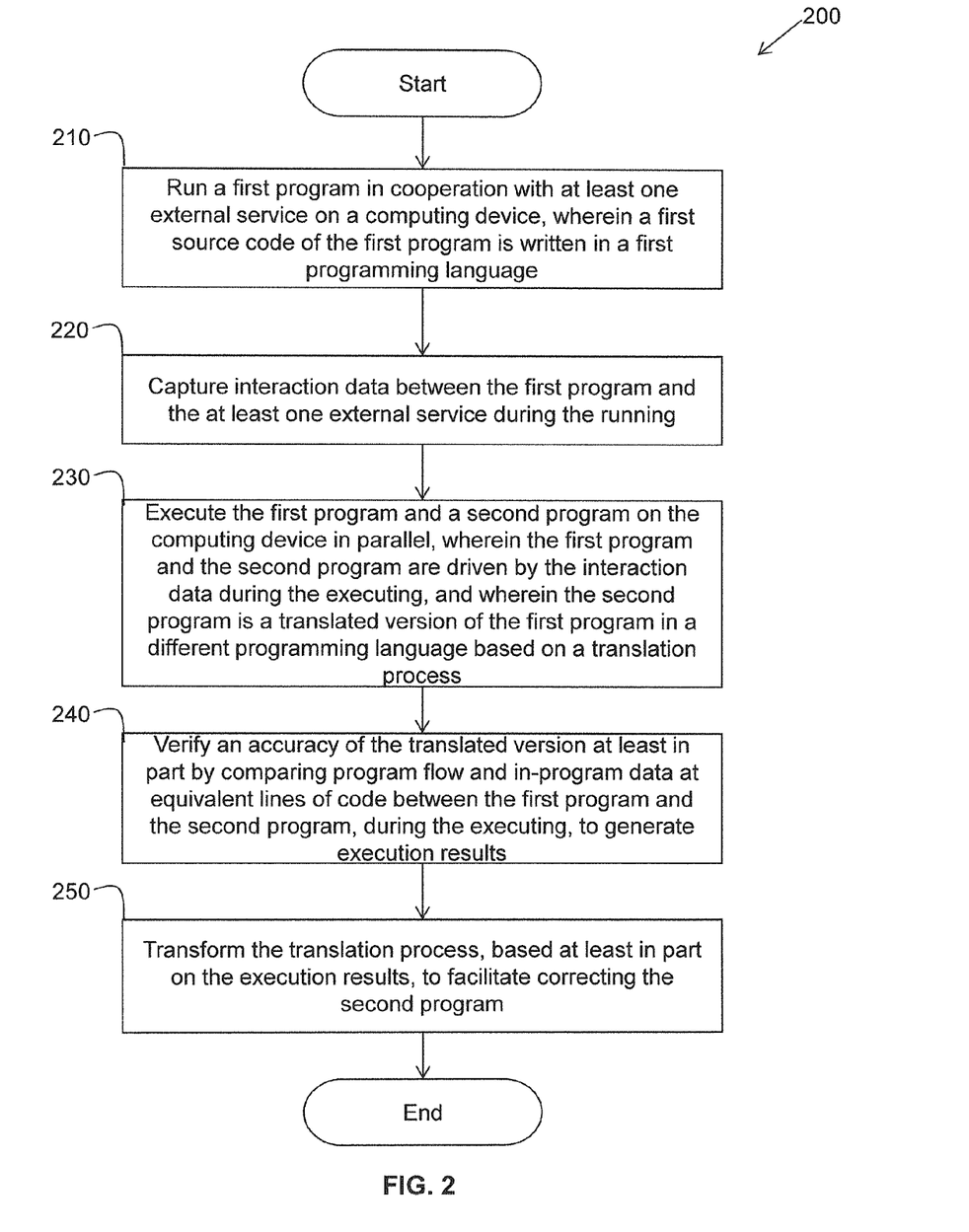
FIG. 2 illustrates one embodiment of a method, which can be performed by the translation verification tool of the computer system of FIG. 1, to verify a translation of a program.

FIG. 2 illustrates one embodiment of a method 200, which can be performed by the translation verification tool 110 of the computer system 100 of FIG. 1, to verify a translation of a program. Method 200 may be implemented by a computing device configured with algorithms that perform the method 200. For example, in one embodiment, method 200 is implemented by a computing device configured to execute a computer application. The computer application is configured to process data in electronic form and includes stored executable instructions that perform the functions of the method 200.

The method 200 will be described from the perspective that a first program in a first programming language is programmed and interacts with external services during execution on a computing device. In one embodiment, the translation verification tool 110 is configured to translate the first program to a second programming language to form/generate a second program. If the translation is accurate, then the second program should execute and interact with the external services in the same manner and produce the same output results as the first program when executed on the computing device. In another embodiment, the translation is performed by a different system and the first program and second program are input to the verification process of method 200. The method 200 verifies that the translation is correct. That is, the method 200 ensures that the second program operates in the same way as the first program with respect to program flow and in-program data. The program flow may include statement flow, and the in-program data may include program variables, for example.

Upon initiating method 200, at block 210, the first program is run (e.g., on the computing device 105 of the computer system 100) in cooperation with at least one external service. For this example, assume that the first program is written in COBOL (source code, a first programming language). An external service may include, for example, a browser, a database, a data structure (e.g., a file), a file system, and another program (e.g., a Java program or another COBOL program) with which the first program interacts.

At block 220, interaction data between the first program and the external services is captured during the running of the first program. The interaction data is the information that flows between the first program and the external services when the first program is executing. In accordance with one embodiment, block 210 and block 220 are performed by capture logic 135 of the translation verification tool 110 on the computing device 105 of the computer system 100.

In one embodiment, method 200 may include instrumenting the first program with first instrumentation code to facilitate the capturing of the interaction data. For example, the first instrumentation code may be incorporated into the source code of the first program before compiling and running the first program at block 210. In accordance with one embodiment, instrumentation logic 130 is configured to instrument the first program with the first instrumentation code in an automated manner. In accordance with another embodiment, the first instrumentation code may be manually incorporated into the source code of the first program by a user (e.g., a human programmer) with the aid of the graphical user interface provided by the visual user interface logic 120. In another embodiment, the first instrumentation code may be bytecode instrumentation where bytecode is injected into the executable code for debugging and other purposes (e.g., adding functions to track program flow). Injecting bytecode in this manner avoids having to recompile the program.

At block 230, the first program and a second program (which is a translation of the first program) are executed in parallel on the computing device. However, at block 230, neither the first program nor the second program is actually interacting with the external services. Instead, during execution, the first program and the second program are each driven by the same interaction data that was captured in block 220, effectively simulating the interaction with the external services. A second source code of the second program is a translation (translated version) of the first source code of the first program from the first programming language (e.g., COBOL) to a second programming language (e.g., a Java dialect, Java compatible language) based on a translation process.

In accordance with one embodiment, block 230 is performed by the replay logic 140 of the translation verification tool 110 on the computing device 105 of the computer system 100. In one embodiment, at block 230, execution of the first program occurs within a first thread of a process on the computing device and execution of the second program occurs within a second thread of the same process on the computing device. In this manner, parallel execution is achieved since the two threads run in the same process and share memory directly, allowing for comparison of program flow and in-program data to verify the translation.

For example, in one embodiment, during execution of the two programs in parallel, data is collected representing the program flow from the first program and from the second program. The program flow may include statement flow, for example. Furthermore, during execution of the two programs in parallel, in-program data is collected from the first program and the second program. The in-program data may include program variables, for example.

At block 240, program flow and in-program data are compared at equivalent lines of code between the first program and the second program, during execution, to generate execution results and verify an accuracy of the translated version. Ideally, the program flow and the in-program data generated during execution of the two programs in parallel should be identical. However, if the translation of the first program (in the first programming language) to the second program (in the second programming language) has one or more errors (i.e., is not correct), then the execution results will indicate the discrepancy.

In one embodiment, comparing program flow and in-program data between the two programs includes identifying a line of code where an error occurs based on non-matching execution results for a particular point in the program. In another embodiment, comparing program flow and in-program data between the two programs includes identifying a group of lines of code where at least one error occurs based on non-matching execution results within the program flow. In accordance with one embodiment, block 240 is performed by replay logic 140 of the translation verification tool 110 on the computing device 105 of the computer system 100.

In one embodiment, method 200 may include instrumenting the first program and the second program with second instrumentation code to facilitate the comparing of the program flow and the in-program data between the two programs. For example, the second instrumentation code may be incorporated into the source code of the first program and the second program before compiling and executing the first program and the second program in parallel at block 230. In accordance with one embodiment, instrumentation logic 130 is configured to instrument the first program and the second program with the second instrumentation code in an automated manner. In accordance with another embodiment, the second instrumentation code may be manually incorporated into the source code of the first program and the second program by a user (e.g., a human programmer) with the aid of the graphical user interface provided by the visual user interface logic 120. In another embodiment, the second instrumentation code may be bytecode instrumentation where bytecode is injected into the executable code for debugging and other purposes (e.g., adding functions to track program flow). Injecting bytecode in this manner avoids having to recompile the programs.

When the execution results indicate errors in the translation process then, at block 250, the translation process is transformed to correct the errors. That is, the translation process is transformed, based on the execution results, to facilitate correcting the second source code of the second program (which is translated from the first source code of the first program). An error may occur in the program flow, the in-program data, or both. In accordance with one embodiment, the correction logic 145 of the translation verification tool 110 analyzes the execution results and makes the appropriate changes to the translation process.

In one embodiment, the translation process is performed by the translation logic 125 (e.g., a translation module including instructions stored in a non-transitory computer-readable medium) of the translation verification tool 110. The translation process may perform the initial translation of the first program from the first programming language to the second programming language to generate the second source code of the second program. Subsequently, the translation process may also perform translations after the translation process is corrected (transformed) based on execution results. For example, blocks 230 to 250 may be iteratively performed by the translation verification tool 110 until there are no errors in the translation process (i.e., until the program flow and the in-program data match between the first program and the second program).

In one embodiment, the second programming language is configured to enable a line-for-line translation of source code from the first programming language to the second programming language. For example, in one embodiment, the first programming language may be COBOL and the second programming language may be a Java dialect.

In this manner, method 200 can automatically do the detailed work of verifying a translated program. Method 200 provides for the efficient and cost-effective verification of a program translated from one programming language to another. The translation of very large programs (e.g., having millions of lines of code) can be verified by method 200. As a result, large legacy programs that are written in outdated programming languages can be updated to more desirable and modern programming languages with efficiency and confidence.

Figure 3:
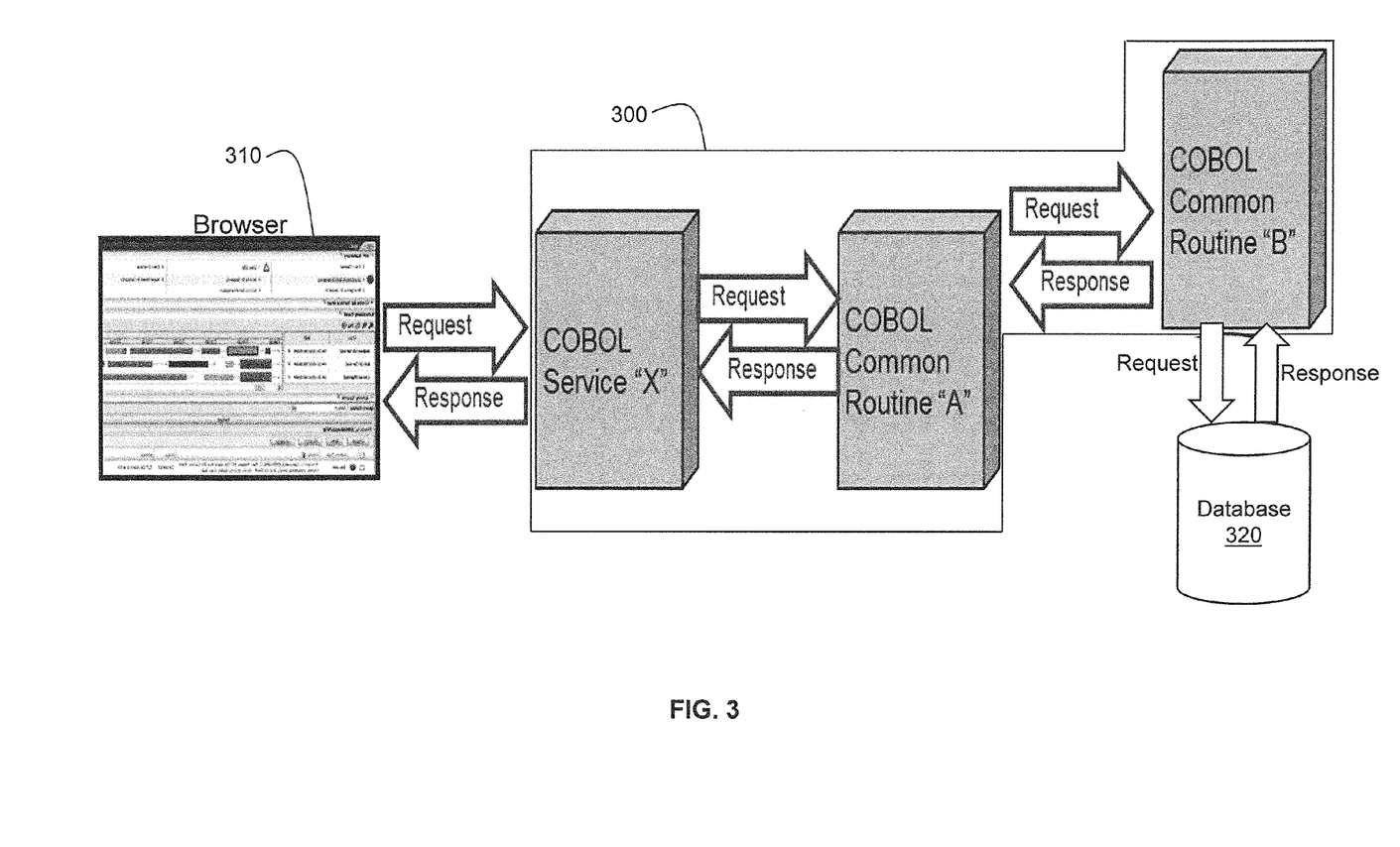
FIG. 3 illustrates a diagram showing a program, having source code written in a first programming language, interfacing to external services.

FIG. 3 illustrates a diagram showing a program 300, having source code written in a first programming language, interfacing to external services. The program 300 includes COBOL Service "X", COBOL Common Routine "A", and COBOL Common Routine "B". The external services include browser 310 and database 320. For example, the program 300 may be a business accounting program (or a portion thereof), where a user interacts with the browser 310 to access the database 320 and initiate performance of accounting functions by the program 300.

When the program 300 is executed, COBOL Service "X" interacts with COBOL Common Routine "A", and COBOL Common Routine "B" interacts with COBOL Common Routine "A". Furthermore, COBOL Service "X" interacts with browser 310, and COBOL Common Routine "B" interacts with database 320. In one embodiment, the various interactions include sending requests and receiving responses to the requests. It may be desirable to update the program 300 to a more modern programming language (e.g., Java) which may be easier to debug, compile, and maintain, for example.

In accordance with one embodiment, a source code (written in COBOL) of the program 300 may be instrumented with first instrumentation code to facilitate the capturing of interaction data. Instrumentation logic 130 of the translation verification tool 110 may be employed to instrument the program 300 with the first instrumentation code. The source code may then be compiled and executed to capture the interaction data at the interfaces between the program 300 and the external services (i.e., the browser 310 and the database 320).

Capture logic 135 of the translation verification tool 110 may be employed to execute the program 300 and capture the interaction data, in accordance with one embodiment. The source code of the program 300 may be compiled by the instrumentation logic 130, the capture logic 135, or an external compiler, in accordance with various embodiments. The visual user interface logic 120 may facilitate interfacing to the external services during execution of the program 300, in accordance with one embodiment. In accordance with another embodiment, capture logic 135 facilitates interfacing to the external services during execution of the program 300.

In this manner, the program 300 can be instrumented with first instrumentation code and interaction data can be captured when the program 300 is executed while normally interfacing to the external services. The captured interaction data may then be used to simulate interaction with the external services during a translation verification process.

Figure 4:
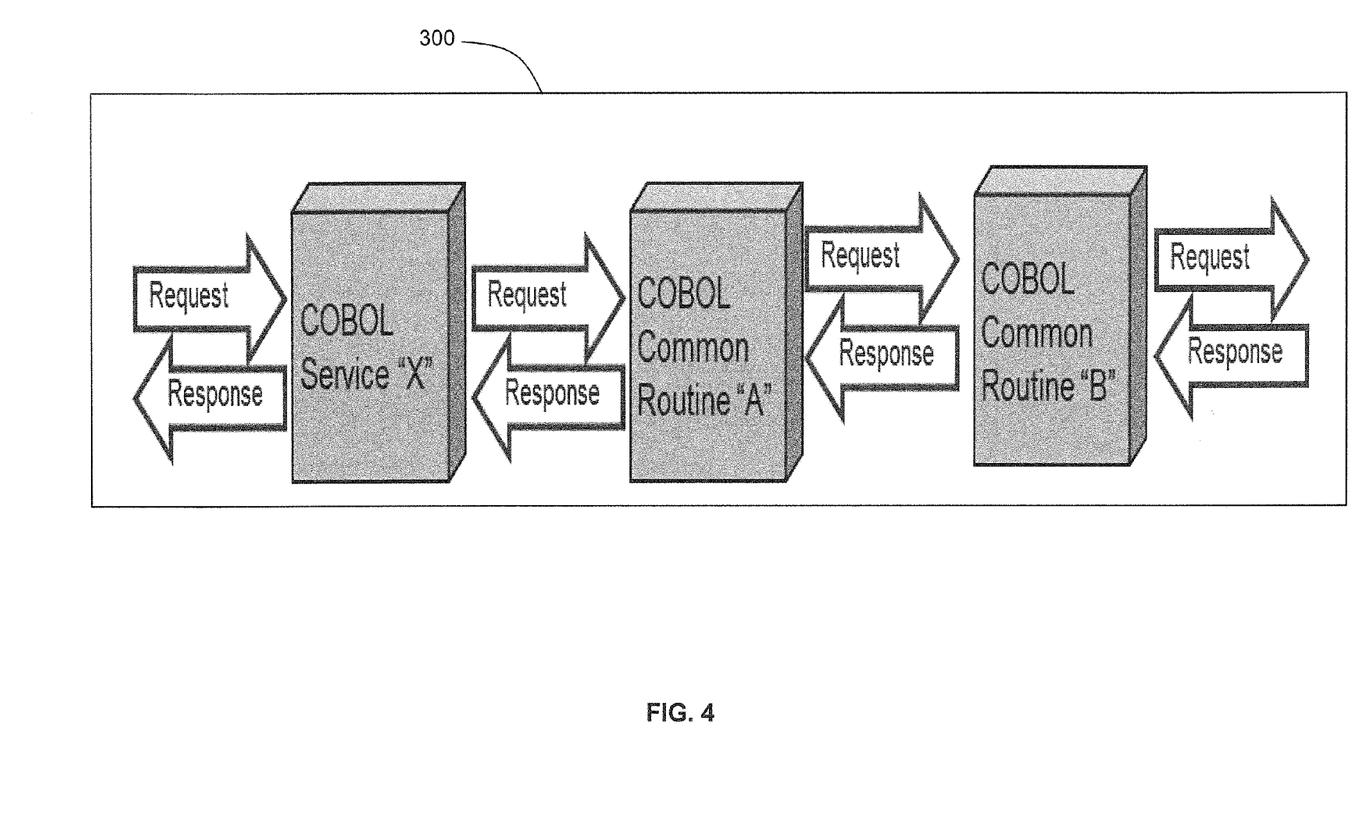
FIG. 4 illustrates a diagram showing the program of FIG. 3, as isolated from the external services.

FIG. 4 illustrates a diagram showing the COBOL program 300 of FIG. 3, as isolated from the external services. In the embodiment of FIG. 4, the COBOL program 300 is not instrumented with first instrumentation code but, instead, is instrumented with second instrumentation code. The second instrumentation code facilitates the comparing of program flow and in-program data during execution of the COBOL program 300 in parallel with a translated version of the program 300 (i.e. second program 500, see FIG. 5). In accordance with one embodiment, instrumentation logic 130 of the translation verification tool 110 may be employed to instrument source code of the COBOL program 300 with the second instrumentation code.

In this manner, the COBOL program 300 can be instrumented with the second instrumentation code, compiled, and executed. Furthermore, the COBOL program 300, as instrumented with the second instrumentation code, can be translated to a second programming language (e.g., a Java dialect) to form the second Java program 500 (see FIG. 5). In accordance with one embodiment, translation logic 125 translates the source code of the COBOL program 300 to the source code of the Java program 500. Furthermore, in one embodiment, instrumentation logic 130 of the translation verification tool 110 may be employed to instrument the source code of the Java program 500 with second instrumentation code to facilitate comparing. The Java program 500 can be compiled, and then executed in parallel with the COBOL program 300 as shown in FIG. 5.

Figure 5:
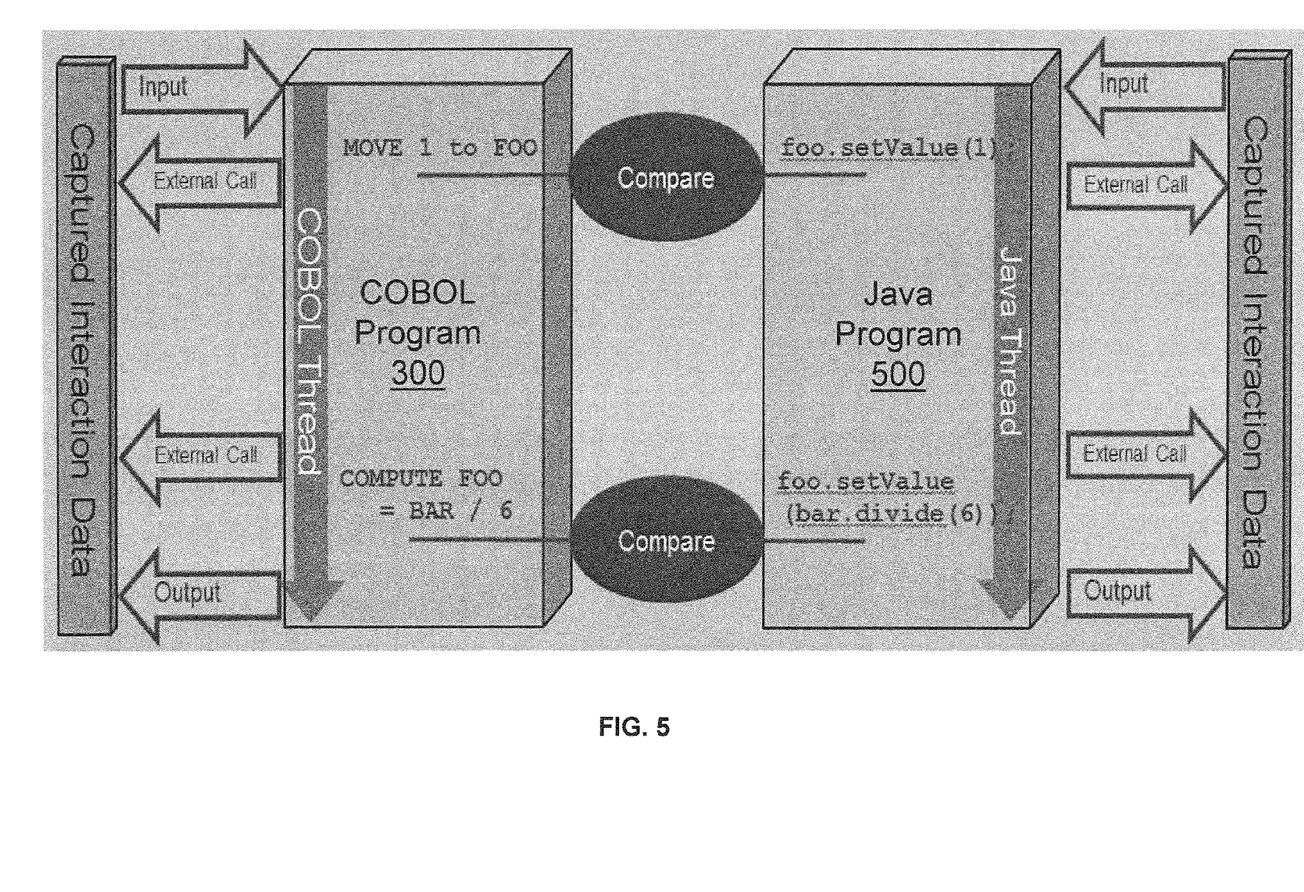
FIG. 5 illustrates a diagram showing how, in one embodiment, captured interaction data is used to drive a first program and a second program in parallel to facilitate the comparing of execution results between the two programs.

FIG. 5 illustrates a diagram showing how, in one embodiment, the captured interaction data is used to drive the COBOL program 300 and the Java program 500 in parallel to facilitate the comparing of execution results between the two programs. The COBOL program 300 (the first program) is executed within a first thread (a COBOL thread) of a process, and the Java program 500 (the second program) is executed within a second thread (a Java thread) of the same process in parallel with the first thread. In accordance with one embodiment, replay logic 140 of the translation verification tool 110 executes the COBOL program 300 and the Java program 500 in parallel.

The captured interaction data simulates interacting with the external services. Therefore, the two programs 300 and 500 do not have to actually interface with the actual external services to verify the translation. As the two programs 300 and 500 execute in parallel, program flow and in-program data are compared (e.g., on a line-for-line basis) and execution results are generated. In accordance with one embodiment, replay logic 140 of the translation verification tool 110 acts as a Java virtual machine (JVM) and generates the execution results.

If the execution results show that there is a mismatch between the two programs, the execution results may be analyzed to determine errors in the translation process. The translation process may then be corrected in an attempt to eliminate the errors. In accordance with one embodiment, correction logic 145 analyzes the execution results and corrects the translation process. The translation process may be provided by translation logic 125, in accordance with one embodiment.

Iteration cycles of translation, comparison, and correction may be performed until errors no longer exist in the translation process (i.e., until the translation process creates a totally correct translation of the first program from the first programming language to the second programming language to form the second program). The second instrumentation code may be removed from the Java program 500 once verification is complete, in accordance with one embodiment. In this manner, a Java program (e.g. a program in a Java dialect, Java-based language, etc.) can be created based on a COBOL program such that the Java program behaves in the same way as the COBOL program when executed.

Even though programming languages of COBOL and Java are used as examples herein, other programming languages may be employed as well. For example, one embodiment of a translation verification tool may be configured to translate a program from FORTRAN to a C++ dialect, and verify the translation.

Systems, methods, and other embodiments have been described that are configured to verify the translation of a program from a first programming language to a second programming language. In one embodiment, capture logic is configured to run a first program in cooperation with at least one external service. A first source code of the first program is written in a first programming language. The capture logic is also configured to capture interaction data between the first program and the at least one external service during the running. Replay logic is configured to perform an execution of the first program and a second program in parallel. The first program and the second program are driven by the interaction data during the execution. A second source code of the second program is a translation of the first source code of the first program to a second programming language. The replay logic is also configured to compare program flow and in-program data at equivalent lines of code between the first program and the second program during the execution to generate execution results that verify the correctness and accuracy of the translation.

Computing Device Embodiment

Figure 6:
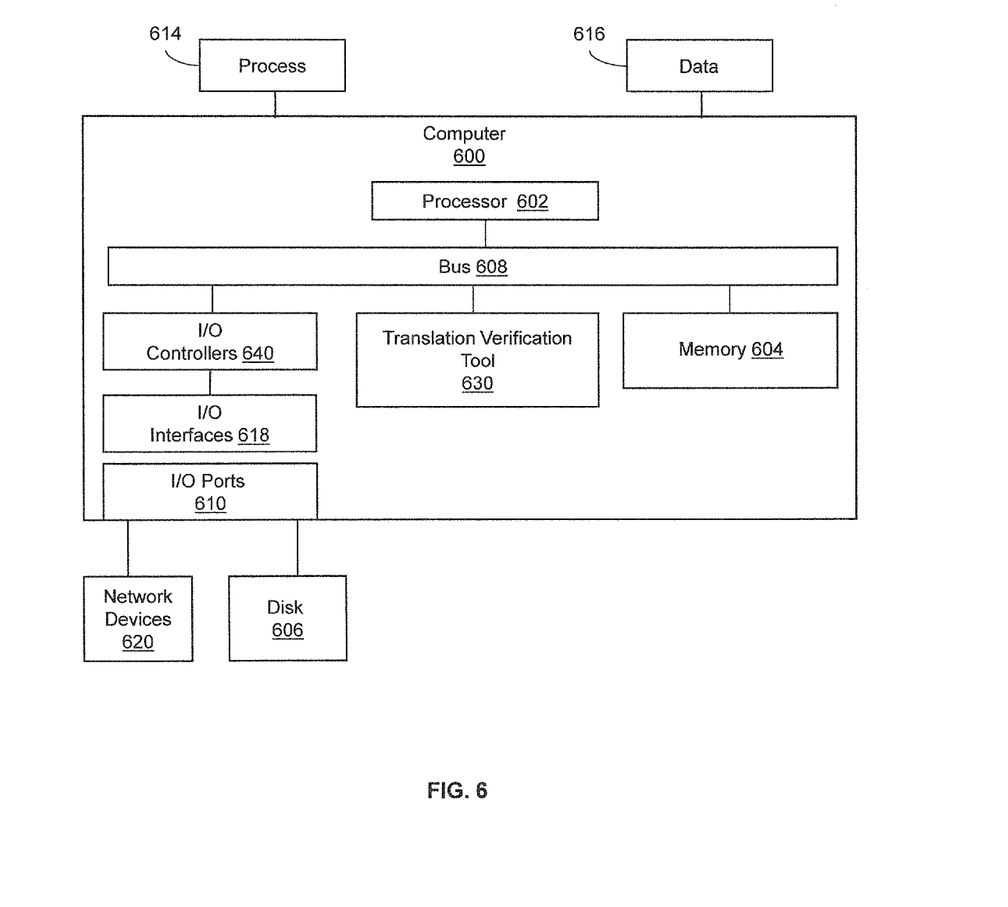
FIG. 6 illustrates one embodiment of a computing device upon which a translation verification tool of a computing system may be implemented.

FIG. 6 illustrates an example computing device that is configured and/or programmed with one or more of the example systems and methods described herein, and/or equivalents. FIG. 6 illustrates one example embodiment of a computing device upon which an embodiment of a translation verification tool may be implemented. The example computing device may be a computer 600 that includes a processor 602, a memory 604, and input/output ports 610 operably connected by a bus 608.

In one example, the computer 600 may include translation verification tool 630 (corresponding to translation verification tool 110 from FIG. 1) configured with a programmed algorithm as disclosed herein to verify the translation of a program from a first programming language to a second programming language. In different examples, the tool 630 may be implemented in hardware, a non-transitory computer-readable medium with stored instructions, firmware, and/or combinations thereof. While the tool 630 is illustrated as a hardware component attached to the bus 608, it is to be appreciated that in other embodiments, the tool 630 could be implemented in the processor 602, a module stored in memory 604, or a module stored in disk 606.

In one embodiment, tool 630 or the computer 600 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the verification of a translation of a program. The means may also be implemented as stored computer executable instructions that are presented to computer 600 as data 616 that are temporarily stored in memory 604 and then executed by processor 602.

Tool 630 may also provide means (e.g., hardware, non-transitory computer-readable medium that stores executable instructions, firmware) for facilitating the verification of the translation of a program from one programming language to another.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A method implemented by a computing device, the method comprising:
    running a first program on a computing device and capturing interaction data between the first program and at least one external service during the running;
    executing the first program and a second program on the computing device in parallel, wherein the first program and the second program are driven by the interaction data during the executing, and wherein the second program is a translated version of the first program in a different programming language based on a translation process;
    verifying an accuracy of the translated version at least in part by comparing program flow and in-program data at equivalent lines of code between the first program and the second program;
    responsive to detecting a discrepancy in the program flow or the in-program data between the first program and the second program based on the comparison:
        analyzing the discrepancy to determine a nature of the discrepancy; and
        modifying the translation process, based on the nature, to generate a modified translation process based on at least one line of code corresponding to the discrepancy;
    translating the first program into a third program based on the modified translation process; and
    verifying an accuracy of the third program at least in part by comparing program flow and in-program data at equivalent lines of code between the first program and the third program.

2. The method of claim 1, wherein the executing of the first program occurs within a first thread of a process on the computing device and the executing of the second program occurs within a second thread of the process on the computing device.

3. The method of claim 1, further comprising translating a first source code of the first program from a first programming language to the different programming language to generate a second source code of the second program.

4. The method of claim 1, further comprising executing the first program and the third program on the computing device in parallel.

5. The method of claim 1, wherein the comparing includes identifying a line of code where an error occurs based on non-matching execution results for a particular point in the program flow.

6. The method of claim 1, wherein the comparing includes identifying a group of lines of code where at least one error occurs based on non-matching execution results within the program flow.

7. The method of claim 1, wherein the executing comprises collecting data representing the program flow from the first program and from the second program, wherein the program flow includes a statement flow.

8. The method of claim 1, wherein the executing comprises collecting the in-program data during the executing from the first program and from the second program, wherein the in-program data includes program variables.

9. The method of claim 1, further comprising instrumenting at least the first program with instrumentation code to facilitate the capturing of the interaction data.

10. The method of claim 1, further comprising instrumenting at least the first program and the second program with instrumentation code to facilitate the comparing.

11. A computing system, comprising:
a capture module, including instructions stored in a non-transitory computer-readable medium, configured to:
   (i) run a first program in cooperation with at least one external service, wherein a first source code of the first program is written in a first programming language, and
   (ii) capture interaction data between the first program and the at least one external service while running the first program;
a replay module, including instructions stored in the non-transitory computer-readable medium, configured to:
   (i) perform an execution of the first program and a second program in parallel, wherein the first program and the second program are driven by the interaction data during the execution, and wherein the second program includes a second source code that is a translation of the first source code of the first program to a second programming language based on a translation process, and
   (ii) verify an accuracy of the second program at least in part by comparing program flow and in-program data at equivalent lines of code between the first program and the second program; and
a correction module, including instructions stored in the non-transitory computer-readable medium, configured to:
   responsive to detecting a discrepancy in the program flow or the in-program data between the first program and the second program based on the comparison:
      analyze the discrepancy to determine a nature of the discrepancy; and
      modify the translation process, based on the nature, to generate a modified translation process based on at least one line of code corresponding to the discrepancy; and
a translation module, including instructions stored in the non-transitory computer-readable medium, configured to:
   translate the first program into a third program based on the modified translation process;
wherein the replay module is configured to:
   verify an accuracy of the third program at least in part by comparing program flow and in-program data at equivalent lines of code between the first program and the third program.

12. The computing system of claim 11, wherein the replay module is configured to execute the first program within a first thread of a process and execute the second program within a second thread of the process.

13. The computing system of claim 11, further comprising an instrumentation module, including instructions stored in a non-transitory computer-readable medium, configured to:
   instrument at least the first program with first instrumentation code to facilitate the capture of the interaction data; and
   instrument at least the first program and the second program with second instrumentation code to facilitate comparison of program flow and in-program data at equivalent lines of code between the first program and the second program.

14. The computing system of claim 11, further comprising a visual user interface module, including instructions stored in the non-transitory computer-readable medium, configured to:
   provide a graphical user interface; and
   facilitate user editing of at least the first program and the second program.

15. The computing system of claim 11, wherein the translation module is configured to translate the first source code of the first program from the first programming language to the second programming language to generate the second source code of the second program.

16. The computing system of claim 11, wherein the replay module is configured to perform an execution of the first program and the third program in parallel.

17. A non-transitory computer-readable medium storing computer-executable instructions that are part of an algorithm that, when executed by a computer, cause the computer to perform functions, wherein the instructions comprise instructions configured for:
   executing a first program within a first thread of a process in parallel with a second program within a second thread of the process, wherein a first source code of the first program is written in a first programming language and a second source code of the second program is a translation of the first source code of the first program to a second programming language based on a translation process, and wherein the first program and the second program are driven by interaction data during the executing;
   verifying an accuracy of the translation at least in part by comparing statement flow and program variables at equivalent lines of code between the first program and the second program;
   responsive to detecting a discrepancy in the statement flow or the program variables between the first program and the second program based on the comparison:
      analyzing the discrepancy to determine a nature of the discrepancy; and
      modifying the translation process to generate a modified translation process based on at least one line of code corresponding to the discrepancy;
   translating the first program into a third program based on the modified translation process; and
   verifying an accuracy of the third program at least in part by comparing statement flow and program variables at equivalent lines of code between the first program and the third program.

18. The non-transitory computer-readable medium of claim 17, wherein the instructions further include instructions configured for translating the first source code of the first program from the first programming language to the second programming language to generate the second source code of the second program.

19. The non-transitory computer-readable medium of claim 17, wherein the instructions further include instructions configured for:
   running the first program in cooperation with at least one external service; and
   capturing the interaction data between the first program and the at least one external service during the running.

20. The non-transitory computer-readable medium of claim 19, wherein the instructions further include instructions configured for:
   instrumenting at least the first program with first instrumentation code to facilitate the capturing of the interaction data; and instrumenting at least the first program and the second program with second instrumentation code to facilitate the comparing the statement flow and program variables at equivalent lines of code between the first program and the second program.

\* \* \* \* \*

UNITED STATES PATENT AND TRADEMARK OFFICE
CERTIFICATE OF CORRECTION

PATENT NO. : 9,804,946 B2  
APPLICATION NO. : 14/722491  
DATED : October 31, 2017  
INVENTOR(S) : Conlon et al.

Page 1 of 1

It is certified that error appears in the above-identified patent and that said Letters Patent is hereby corrected as shown below:

In the Claims

In Column 17, Line 29, in Claim 11, after "program;" delete "and".

Signed and Sealed this
Twenty-fifth Day of September, 2018

Andrei Iancu
*Director of the United States Patent and Trademark Office*